United States Patent
Park et al.

(10) Patent No.: US 7,336,438 B2
(45) Date of Patent: Feb. 26, 2008

(54) WRITE CONTROL METHOD OF HARD DISK DRIVE, HARD DISK DRIVE ADAPTING THE METHOD AND RECORDING MEDIUM THEREOF

(75) Inventors: Cheol-hoon Park, Suwon-si (KR); Sang-hoon Chu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 50 days.

(21) Appl. No.: 11/452,898

(22) Filed: Jun. 15, 2006

(65) Prior Publication Data

US 2006/0291089 A1    Dec. 28, 2006

(30) Foreign Application Priority Data

Jun. 27, 2005    (KR) .................. 10-2005-0055889

(51) Int. Cl.
G11B 5/596    (2006.01)

(52) U.S. Cl. .................................. 360/77.08

(58) Field of Classification Search ............. 360/77.08, 360/77.02, 75, 60, 57, 58, 77.04
See application file for complete search history.

(56) References Cited

U.S. PATENT DOCUMENTS

| | | | |
|---|---|---|---|
| 7,002,770 B2* | 2/2006 | Schmidt | 360/77.08 |
| 7,023,649 B2* | 4/2006 | Schmidt | 360/77.08 |
| 7,027,255 B2* | 4/2006 | Schmidt | 360/77.08 |
| 7,203,022 B2* | 4/2007 | Kisaka | 360/77.02 |
| 2004/0125496 A1* | 7/2004 | Schmidt | 360/77.08 |
| 2004/0218304 A1 | 11/2004 | Goker et al. | |
| 2005/0152057 A1* | 7/2005 | Schmidt | 360/60 |
| 2005/0152058 A1* | 7/2005 | Schmidt | 360/60 |

FOREIGN PATENT DOCUMENTS

| | | |
|---|---|---|
| JP | 11-045524 | 2/1999 |
| JP | 2000-315363 | 11/2000 |
| JP | 2002-260355 | 9/2002 |
| JP | 2004-178662 | 6/2004 |
| JP | 2004-206770 | 7/2004 |
| KR | 100175259 | 11/1998 |
| KR | 2000-132931 | 5/2000 |

* cited by examiner

*Primary Examiner*—Fred F. Tzeng
(74) *Attorney, Agent, or Firm*—Staas & Halsey LLP (57) ABSTRACT

The present invention relates to a write control method of a hard disk drive, a hard disk drive adapting the method, and a recording medium storing a program for executing the method. The write control method of a hard disk drive having a disk where servo bursts are written radially comprises: generating a primary position error signals (PESs) with respect to a target offtrack based on a difference between servo burst signals read from two adjacent servo bursts; generating a secondary PES with respect to the target offtrack based on a sum of the primary PESs or a difference there between; determining whether both the primary PESs and the secondary PES are within a predetermined write bump limit; and performing a write operation at the target offtrack if both the primary PESs and the secondary PES are within the predetermined write bump limit, otherwise prohibiting the write operation.

7 Claims, 10 Drawing Sheets

WRITE CONTROL METHOD OF HARD DISK DRIVE, HARD DISK DRIVE ADAPTING THE METHOD AND RECORDING MEDIUM THEREOF

CROSS-REFERENCE TO RELATED APPLICATIONS

This application claims the benefit of Korean Patent Application No. 2005-0055889, filed on Jun. 27, 2005, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a write control method of a hard disk drive, a hard disk drive adapting the method, and a recording medium storing a program for executing the method.

2. Description of the Related Art

A hard disk drive (HDD) is a magnetic writing device used to store information. Information is written in concentric tracks formed on a surface of a disk. Disks are mounted on a spindle motor to be rotated, and information is accessed by a read/write head mounted on an actuator arm rotated by a voice coil motor (VCM). The VCM is excited by current to rotate an actuator and move heads mounted on an actuator arm across the disk. When the HDD operates, the read/write head should be precisely aligned on tracks of the disk so as to ensure reading and writing information.

Traditionally, the position of the head is controlled by a servo control circuit. The servo control circuit detects and controls the position of the head using a servo bursts written on the disk.

In order to let the head follow the track correctly, servo information including servo bursts should be written on the track. STW (servo track write) is a process for writing such servo information on the disk.

To precisely control the position of the head, the quality of the servo bursts written in the STW process, that is, both the intensity and the phase of the servo bursts are important.

As a storage density of the HDD increases, a track density increases together. As the track density increases, in contrast, a track width decreases, and, accordingly, the precision necessary to write the servo information on the disk comes up against a limit.

As a result, servo bursts written on the disk are hardly uniform by track and even by servo sector in one track.

The HDD determines the position of the head using servo bursts. Thus, when the quality of the servo bursts is poor, it becomes difficult to calculate the position of the head correctly, and in worst case particular, the possibility of damaging data on adjacent tracks increases during a write operation.

Figure 1:
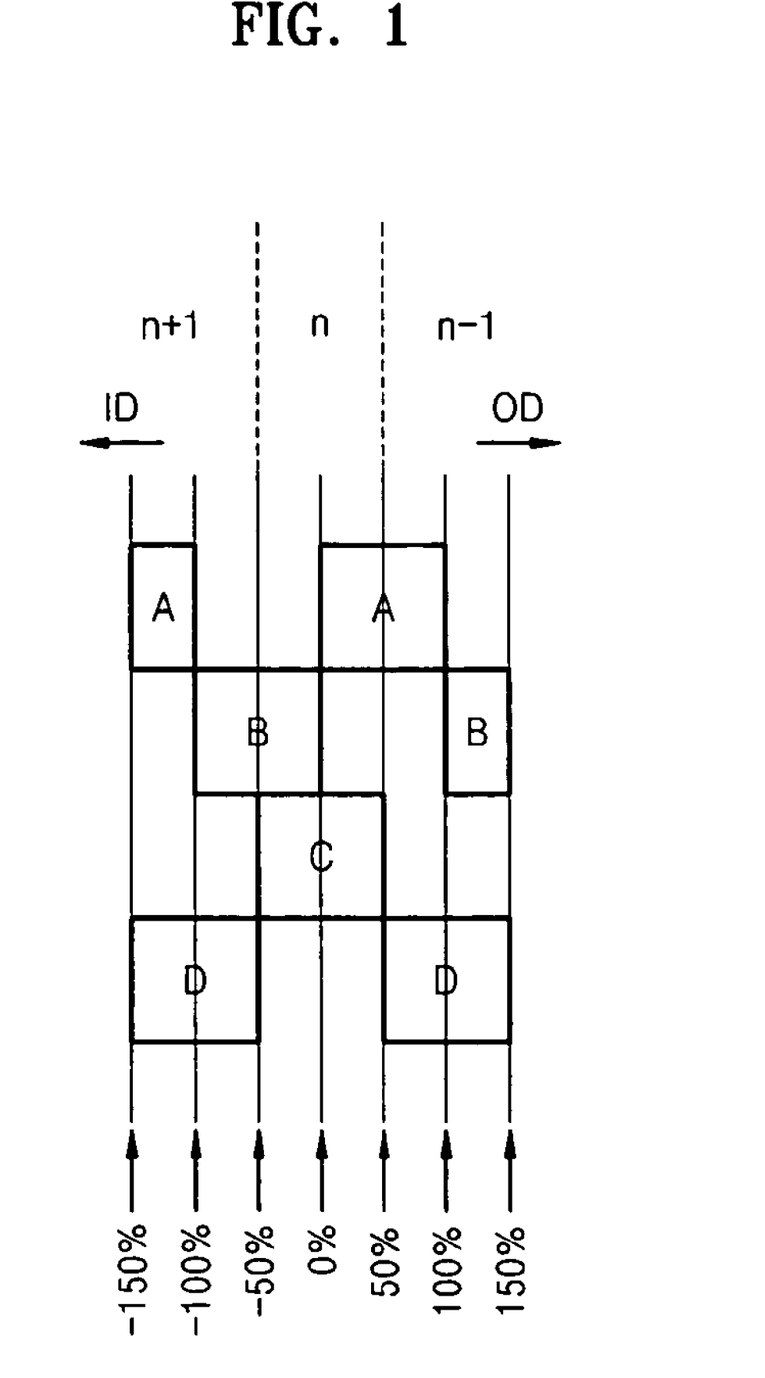
FIG. 1 shows the written state of servo bursts according to a 4-servo burst technique.

FIG. 1 shows the written state of servo bursts according to a 4-servo burst technique. In FIG. 1, "n" denotes a track number, "ID" denotes an inner diameter of the disk, and "OD" denotes an outer diameter of the disk. The 4-servo burst technique uses four kinds of servo bursts, that is, A, B, C, and D servo bursts, and every servo burst is separated from each other by a predetermined distance in a direction of a track and in a direction of the diameter of a disk. Generally speaking, servo bursts are disposed radially on the disk and alternatively in every track or in every half of a track.

Figure 2:
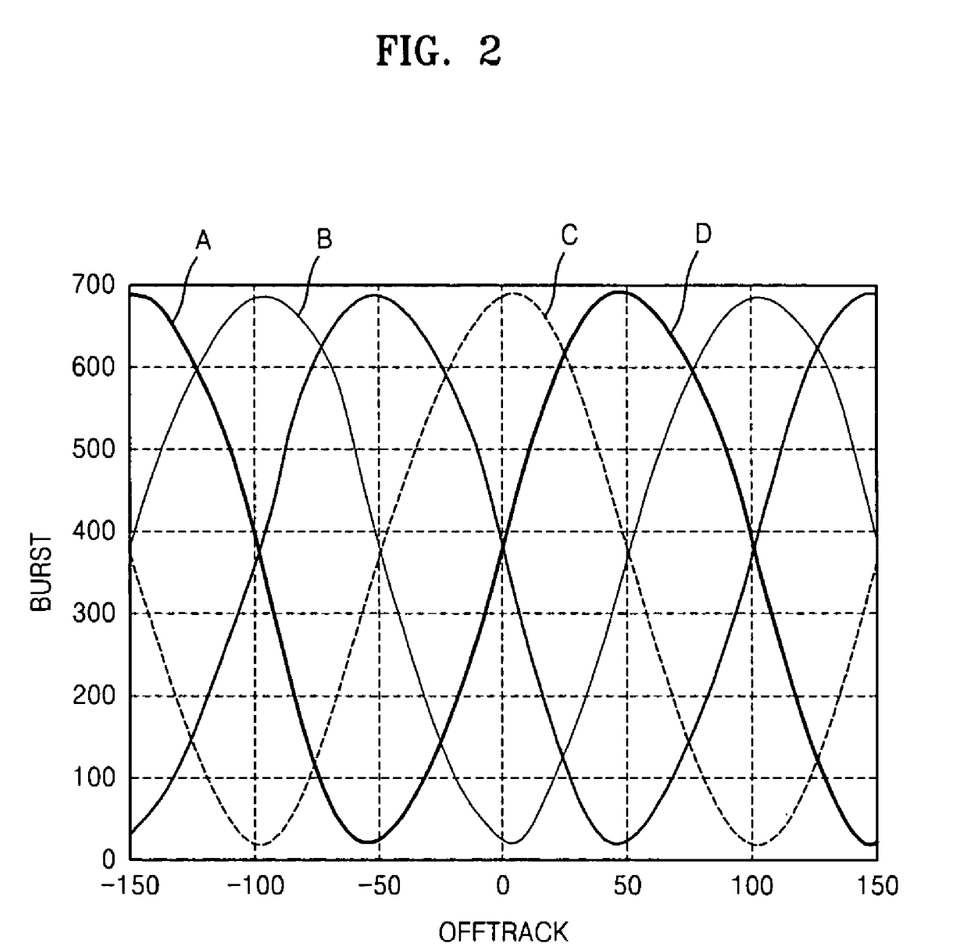
FIG. 2 shows a profile of a servo burst signal read by a head.

FIG. 2 shows profiles of a servo burst signals read by the head versus an amount of an offtrack. The longitudinal axis represents the position of the head in the diameter direction of the disk, and the perpendicular axis represents the magnitudes (or intensities) of servo bursts read by the head. It can be understood that the position of the head is indicated by a degree (offtrack) as much as deviation of the head from a center of a target track, marked with 0 in the longitudinal axis, as shown in FIG. 1.

Assuming that servo bursts are written uniformly in sectors and tracks, maximum values of each profile read from servo bursts should be identical, and peaks of servo burst signals read from the A, B, C, and D servo bursts should be disposed in positions off-tracked by −50%, 0%, 50%, or 100%, respectively.

The servo control circuit of the HDD calculates the position of the head by comparing magnitudes of four servo burst signals read by the head. Thus, in order to precisely calculate the position of the head, servo bursts should be written uniformly in all sectors and all tracks.

The HDD with the 4-servo burst technique generates a position error signal (PES) using Equation 1 as follows.

If (−7%<=target offtrack<=7%)

$$PES=PES\_(A-B)=A-B$$

Else if (−43%<target offtrack<−7%) or (7%<target offtrack<43%)

$$PES=PES\_N=(A-B)-(C-D)$$

$$PES=PES\_P=(A-B)+(C-D)$$

Else if (−50%<=target offtrack<−43%) or (43%<=target offtrack<=50%)

$$PES=PES\_(C-D)=C-D, \quad (1)$$

Where, the target offtrack indicates an offtrack from a center of the target track to the target position. This notation is useful in the case when there are several data tracks between adjacent servo tracks because the position of the target data track is expressed by an offtrack from the center of target servo track. In addition, the symbols including A, B, C, and D are used to represent servo burst signals or servo bursts, respectively. Values of PESs obtained by a difference (A−B) or (C−D) between two adjacent servo burst signals are referred to as primary PESs, and values of PESs obtained by the sum PES_P and a difference PES_N of the primary PESs are referred to as secondary PESs hereinafter.

Figure 3:
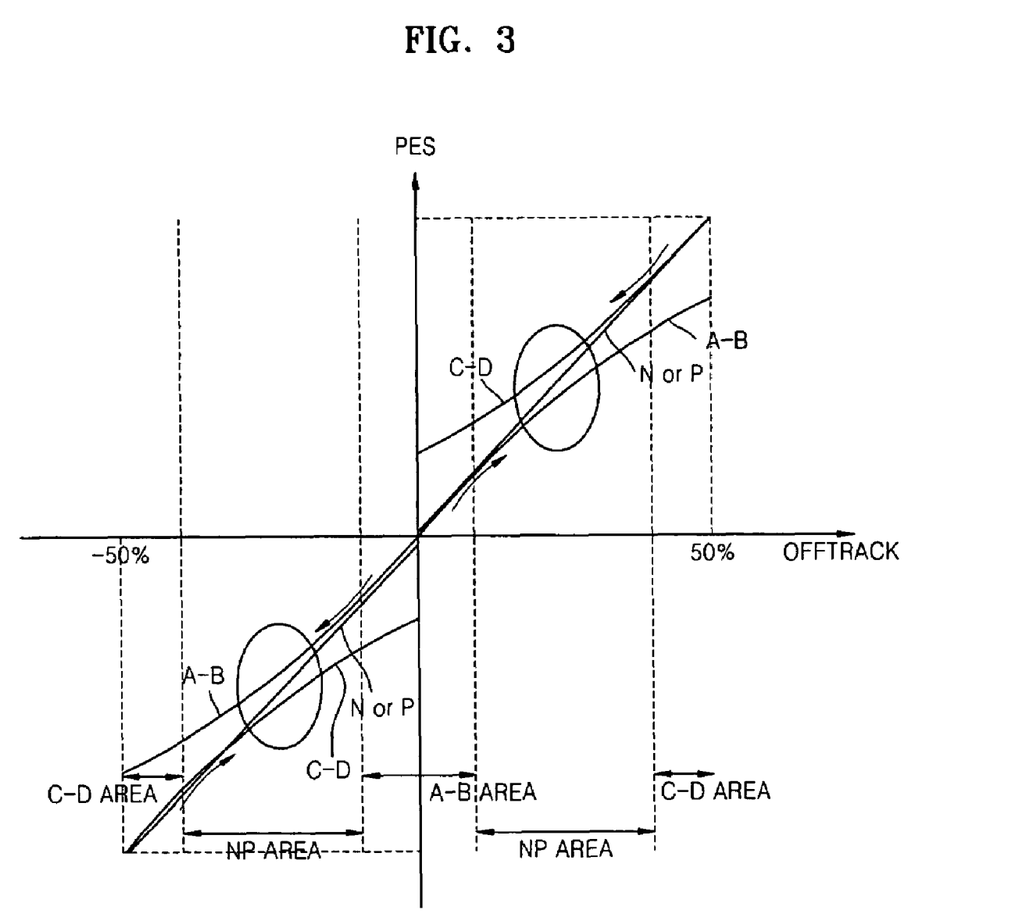
FIG. 3 shows the relationship between a target offtrack and a PES.

FIG. 3 shows the relationship between the target offtrack and the PES. Referring to FIG. 3, it can be understood that an area A−B uses PES (PES_(A−B)) calculated by A−B (A minus B) within a range of −7 to 7% from a track center, an area C−D uses PES (PES_(C−D)) calculated by C−D within ranges of −43 to −50% and 43 to 50%, and an area NP uses PES (PES_NP) calculated by N (=(A−B)−(C−D)) or P (=(A−B)+(C−D)) within ranges of −43 to −7% or 7 to 43%.

With respect to PES_(A−B) or PES_(C−D), the linearity of PES_(A−B) or PES_(C−D) may be distorted due to saturation of (A−B) or (C−D). On the other hand, with respect to PES_NP, saturation of PES_NP does not occur even if saturation of (A−B) or (C−D) occurs. In addition, with respect to PES_NP, discontinuity of PES_NP is generated by offset in the place where PES_N and PES_P are changed, e.g. at the origin in FIG. 3. Thus, the PES should be calculated separately according to areas divided by the magnitude of the target offtrack, as shown in FIG. 3.

Circles shown in FIG. 3 represent portions where the saturation of (A−B) and (C−D) occurs.

To calculate the value of a PES using Equation 1 is based on the assumption that normal servo bursts, as illustrated in FIGS. 1 and 2, were written.

Figure 4:
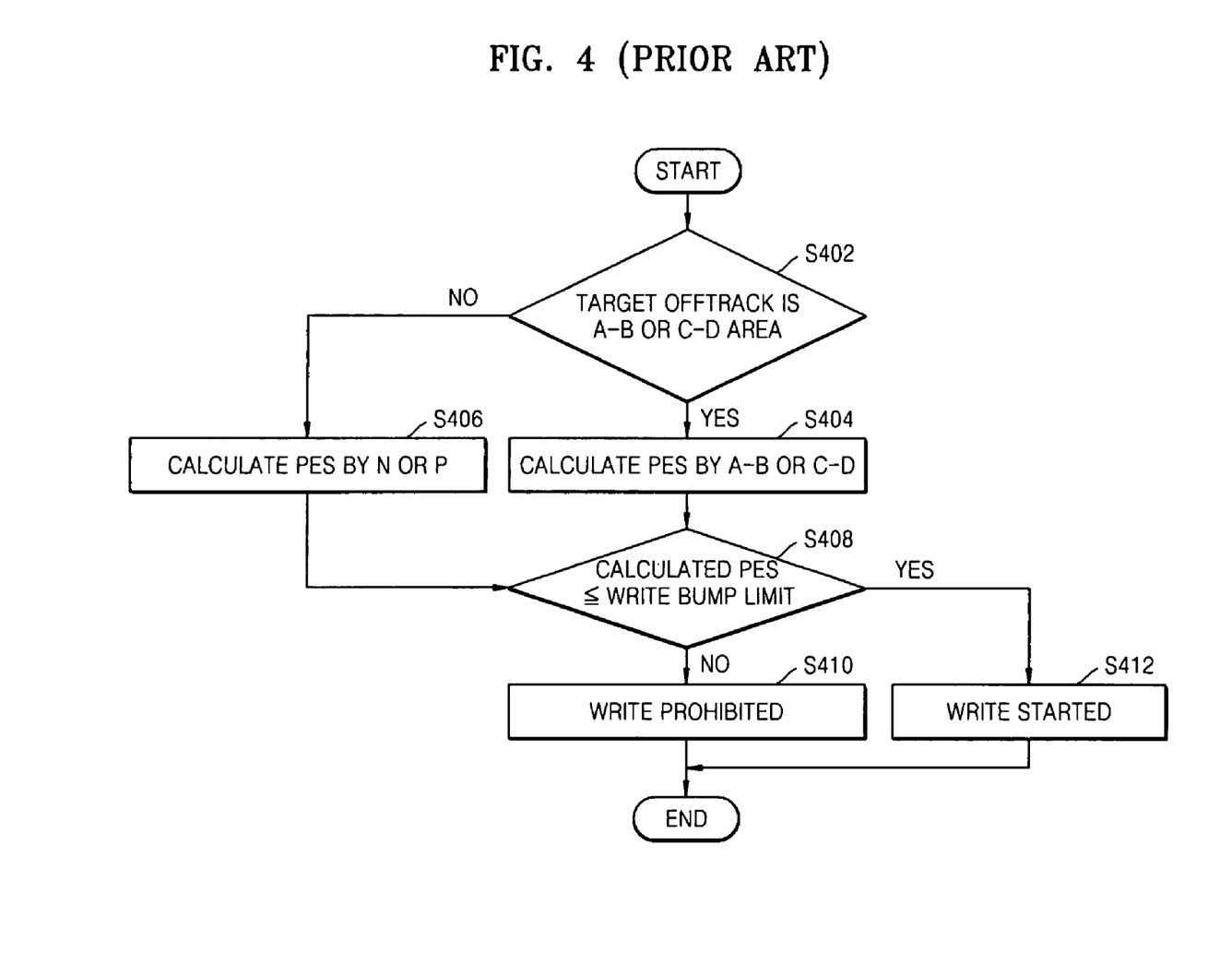
FIG. 4 shows a flowchart of a conventional write control method of an HDD.

FIG. 4 shows a flowchart of a conventional write control method of the HDD. Referring to FIG. 4, it can be understood that a write operation is started depending on the determination as to whether the value of PES, which is calculated by A−B in the A−B area, exists within a predetermined range, or as to whether the value of PES, which is calculated by C−D in the C−D area, exists within a predetermined range.

In operation S402, it is determined whether the target offtrack exists in the area A−B, or exists in an area C−D.

If it is determined that the target offtrack exists in the area A−B or the area C−D, based on the determination result in operation S402, a PES is calculated using A−B or C−D in operation S404, respectively. Referring to FIG. 3, a PES is calculated using A−B in the area A−B, and a PES is calculated using C−D in the area C−D.

If it is determined that the target offtrack does not exist in the area A−B or C−D in operation S402, a PES is calculated using N or P in operation S406. Referring to FIG. 3, a PES is calculated using N or P in an area NP.

In operation S408, it is determined whether the PES calculated in operation S404 or S406 is within a predetermined write bump limit. The calculated PES to be considered in operation S404 is PES_A−B in the area A−B, PES_C−D in the area C−D, or PES_NP in the area NP.

If it is determined that the calculated PES is within the predetermined write bump limit in operation S408, the write operation is performed in operation S412, otherwise the write operation is prohibited in operation S410.

Figure 5:
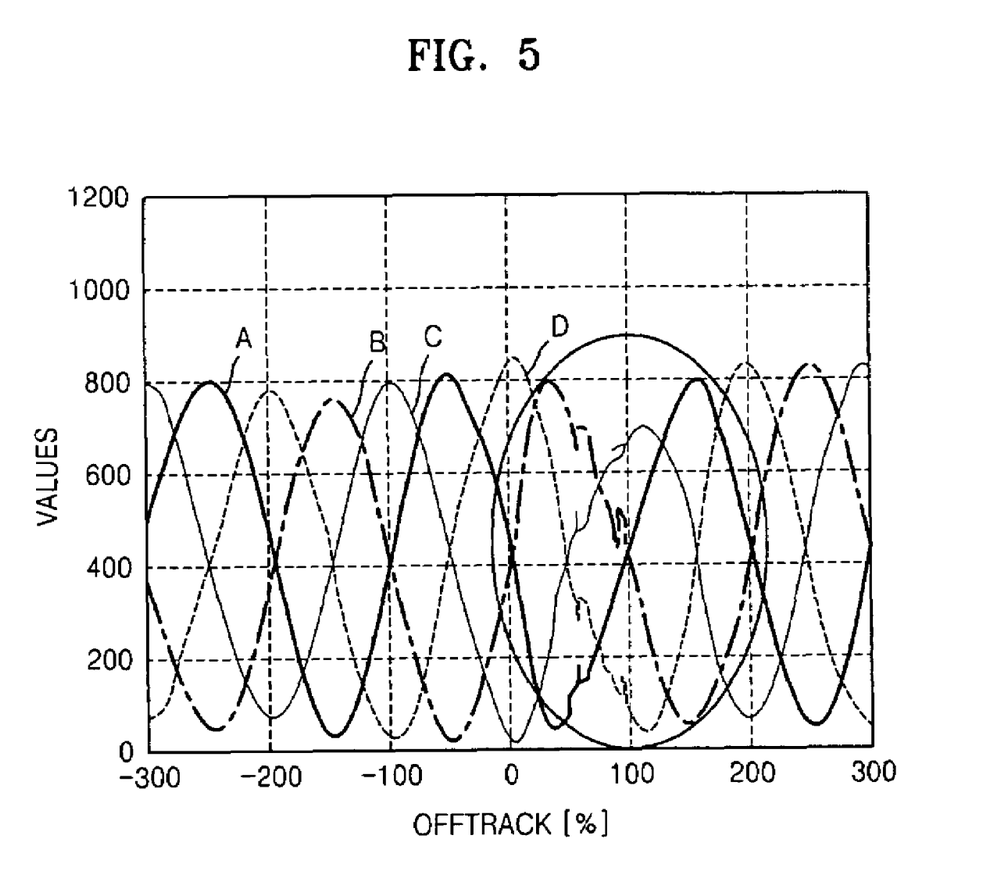
FIG. 5 shows another profile of a servo burst signal read by a head.

FIG. 5 shows another profile set of servo burst signals read by the head. Referring to FIG. 5, it can be seen that the peak of a servo burst signal is distorted in a portion marked by a circle, and the peaks of the servo burst signals are not precisely disposed in positions off-tracked by −50%, 0%, 50%, or 100%, respectively. Here, the term "distortion" means that a PES does not have linearity.

Figure 6:
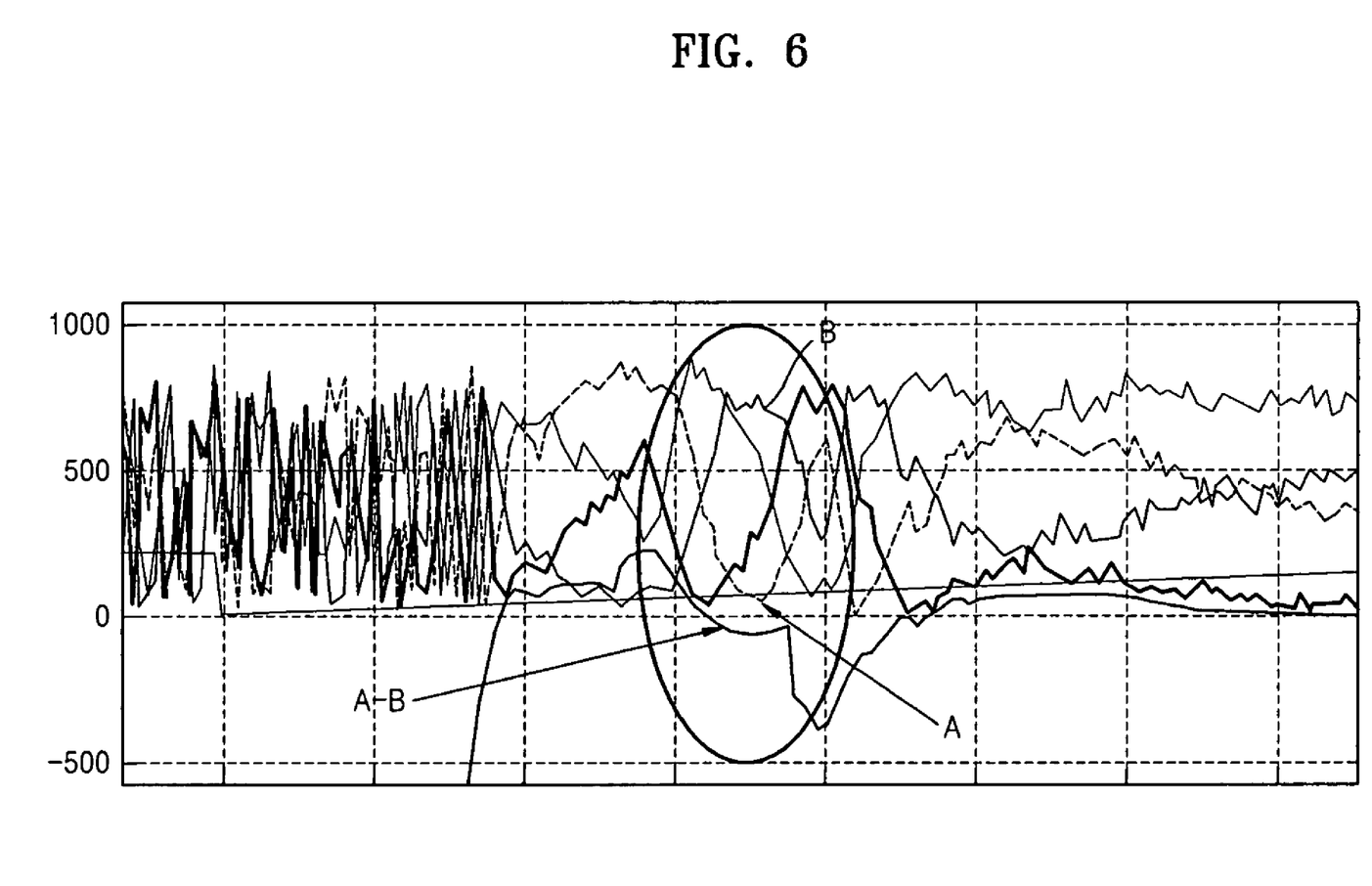
FIG. 6 illustrates the distortion of a PES caused by a defective servo burst signal as shown in FIG. 5.

FIG. 6 shows the distortion of a PES caused by a defective servo burst as illustrated in FIG. 5. Referring to FIG. 6, it can be understood that PES (PES_(A−B)) cannot be linear and is distorted due to a servo burst signal B smaller in magnitude than a servo burst signal A as shown in a portion marked by a circle.

If some of servo bursts are defective, as shown in FIG. 5 or if the width of the read head is narrow, distortion may occur in PES (PES_(A−B), PES_(C−D)) calculated by A−B or C−D. Thus, the correct position of the head is not reflected into the PES. In other words, indeed it is determined that a PES is within the write bump limit, but, the head may be not within a range corresponding to the write bump limit. If servo bursts are not written uniformly in all sectors and all tracks, the profile of the servo burst is distorted as shown in FIG. 5, so that the position of the head cannot be calculated correctly.

If the position of the head cannot be calculated during a write operation, data may be written in a place away from the center of a data track so that written data cannot be precisely reproduced and data on an adjacent track can be damaged.

For this reason, a defect processing process which detects defective servo sectors or tracks and processing them not to be written or read of data is needed in a manufacturing process of an HDD.

In the defect processing process, for example, servo bursts are determined as defective when a PES has a value more than a threshold value at the position where data is read or written, and then servo sectors or tracks having those servo bursts are defect-processed.

However, although a PES is satisfactory at the position where the write operation is started, data can be written in incorrect position or data in adjacent tracks may be erased in the case when a defective servo burst exists in some distance from the position.

SUMMARY OF THE INVENTION

Additional aspects, features, and/or advantages of the invention will be set forth in part in the description which follows and, in part, will be apparent from the description, or may be learned by practice of the invention.

The present invention provides a write control method to control a write operation of a hard disk drive depending on the determination as to whether a PES is within a write bump limit during a write operation.

The present invention provides a hard disk drive adapting the write control method.

The present invention provides a computer-readable recording medium having recorded thereon a program for executing the write control method of a hard disk drive.

According to an aspect of the present invention, there is provided a write control method of a hard disk drive having a disk where servo bursts are written radially, the method including: generating a primary position error signals (PESs) with respect to a target offtrack based on a difference between servo burst signals read from two adjacent servo bursts; generating a secondary PES with respect to the target offtrack based on a sum of the primary PESs or a difference there between; determining whether both the primary PESs and the secondary PES are within a predetermined write bump limit; and performing a write operation at the target offtrack if both the primary PESs and the secondary PES are within the predetermined write bump limit, otherwise prohibiting the write operation.

According to another aspect of the present invention, there is provided a hard disk drive, the hard disk drive including: a disk having servo bursts written radially; a spindle motor rotating the disk; a head writing or reading information in or from the disk; a voice coil motor (VCM) driver driving a VCM that moves the head across a surface of the disk; and a controller controlling the VCM driver to write data at a target offtrack by the head, wherein the controller determines whether not only a primary position error signals (PESs) calculated by a difference between servo burst signals read from adjacent servo bursts but also a secondary PES calculated by a sum or difference of the primary PESs are within a predetermined write bump limit, and controls to start a write operation if the primary and the secondary PES are within the predetermined write bump limit, otherwise to prohibit the write operation.

According to still another aspect of the present invention, there is provided a computer-readable recording medium on which a program for a write control of a hard disk drive having a disk where servo bursts are written radially, the program controls the hard disk drive according to a process including: generating a primary position error signals (PESs) with respect to a target offtrack based on a difference between servo burst signals read from two adjacent servo bursts; generating a secondary PES with respect to the target offtrack based on a sum of the primary PESs or a difference there between; determining whether both the primary PESs and the secondary PES are within a predetermined write bump limit; performing a write operation at the target offtrack if both the primary PESs and the secondary PES are within the predetermined write bump limit, otherwise prohibiting the write operation.

According to another aspect of the present invention, there is provided a write control method of a hard disk drive having a disk where servo bursts are written radially, the method comprising determining whether a target offtrack exists in the area A–B or C–D; calculating at least one position error signal (PES)_NP by N or P if the target offtrack does not exist in the area A–B or C–D; determining if the at least one PES_NP is within a predetermined write bump limit; prohibiting writing to the disk if the PES_NP is not within a predetermined write bump limit; and performing a write operation if the PES_NP is within a predetermined write bump limit.

According to another aspect of the present invention, there is provided a write control method of a hard disk drive having a disk where servo bursts are written radially, the method comprising calculating position error signal PES by A–B or C–D and PES_NP by N or P; determining if both PES and PES_NP are within a predetermined write bump limit; prohibiting writing to the disk if either PES or PES_NP is not within a predetermined write bump limit; and performing a write operation if both PES and PES_NP are within a predetermined write bump limit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 7:
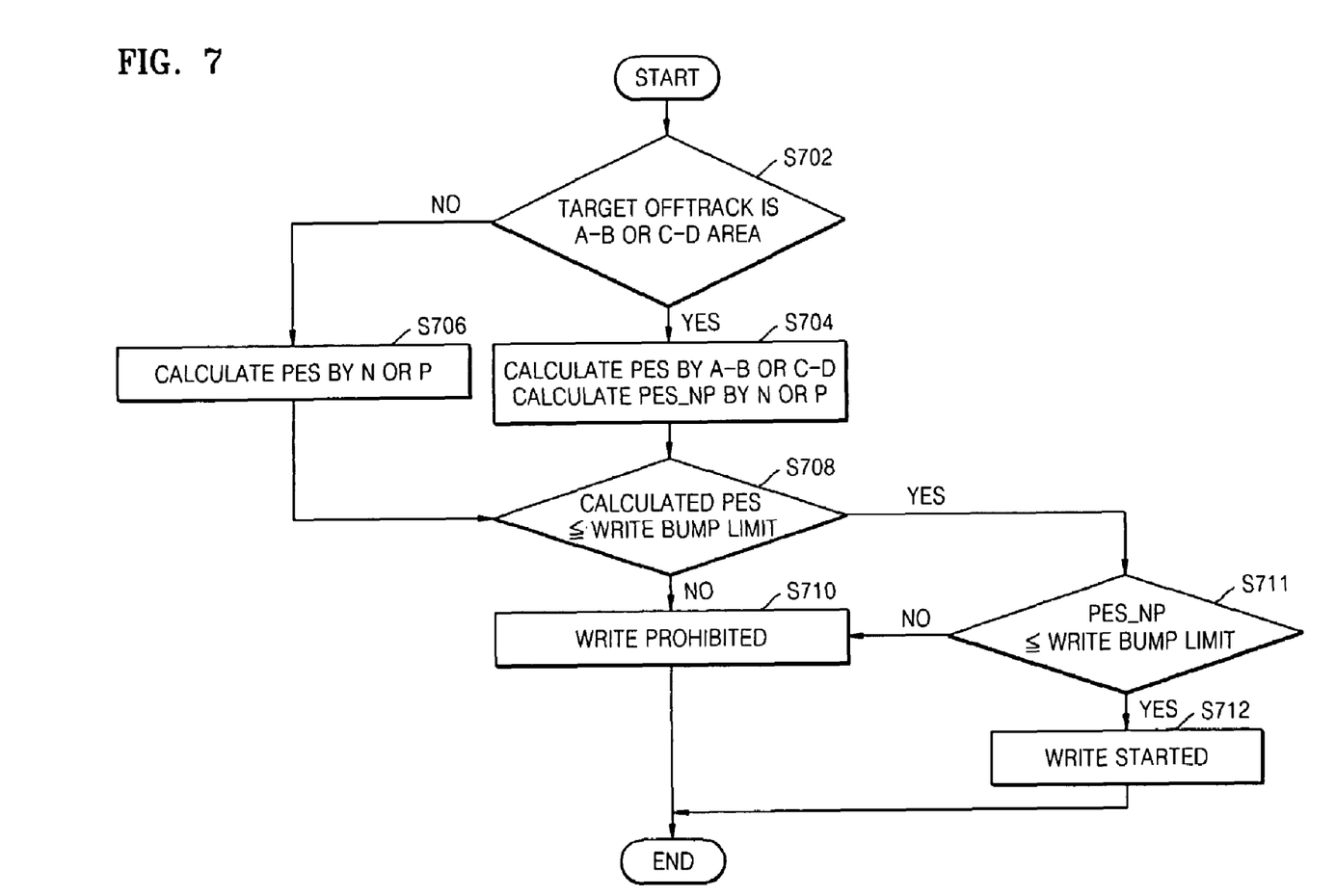
FIG. 7 shows a flowchart of a write control method a hard disk drive according to an exemplary embodiment of the present invention.

FIG. 7 shows a flowchart of a write control method of a hard disk drive according to an exemplary embodiment of the present invention. Referring to FIG. 7, it can be understood that whether not only PESs (PES_(A–B), PES_(C–D)) calculated by A–B or C–D in an area A–B or an area C–D but also PESs (PES_NP) calculated by N and P are within a predetermined write bump limit can be used to determined to start a write operation. In operation S702, it is determined whether a target offtrack exists in the area A–B or an area C–D.

If it is determined that the target offtrack exists in the area A–B or the area C–D in operation S702, all of PESs (PES_(A–B), PES_(C–D)) calculated by A–B or C–D and PESs PES_NP calculated by N and P are calculated in operation S704. Referring to FIG. 3, a PES(PES_(A–B)) is calculated by A–B in the area A–B, a PES(PES_(C–D)) is calculated by C–D in the area C–D, and a PES(PES_NP) is calculated by N and P in the areas A–B and C–D.

If it is determined that the target offtrack does not exist in the area A–B or C–D in operation S702, a PES (PES_NP) is calculated by N or P in operation S706. Referring to FIG. 3, a PES(PES_NP) is calculated by N and P in an area NP.

In operation S708, it is determined whether the PES calculated in operation S704 or S706 is within a predetermined write bump limit. The calculated PES to be considered in operation S704 is PES_A–B in the area A–B, PES_C–D in the area C–D, or PES_NP in the area NP.

If it is determined that the calculated PES is not within the predetermined write bump limit in operation S708, the write operation is prohibited in operation S710. If it is determined that the calculated PES is within the predetermined write bump limit in operation 710, it is determined whether the PES_NP is within the predetermined write bump limit in operation S711. If it is determined that the calculated PES_NP is not within the predetermined write bump limit in operation S711, the write operation is prohibited in operation S710. If it is determined that the calculated PES_NP is within the predetermined write bump limit in operation S711, the write operation is performed in operation S712.

By using the method illustrated in FIG. 7, position information can be additionally obtained using a signal PES_NP having good linearity even in the area A–B and the area C–D shown in FIG. 3, so that data loss on an adjacent tracks can be effectively prevented.

Figure 8:
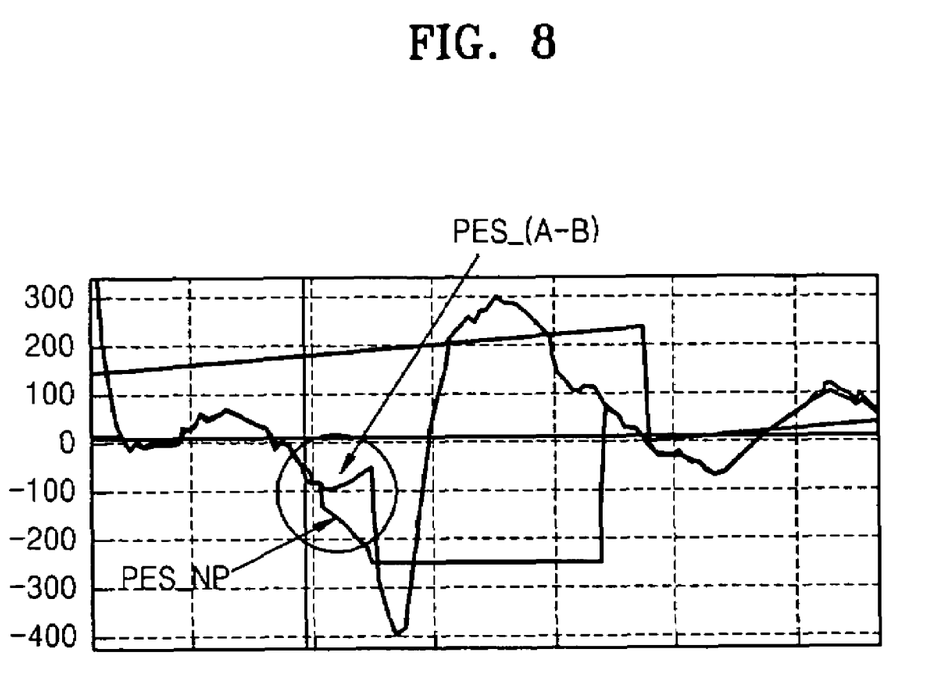
FIG. 8 shows a waveform diagram showing an application example of the present invention.

FIG. 8 shows a waveform diagram of an exemplary embodiment of the present invention. In FIG. 8, the portion directed by a circle is the place where the distortion of PES_(A–B) is occurred due to the distorted servo burst signal as shown in FIG. 5. However, it can be seen that PES_NP keeps linearity. That is, PES_(A–B) does not represent the actual position of the head due to saturation, whereas PES_NP represents the actual position of the head.

Thus, it can be understood that data loss in adjacent tracks is prevented effectively by determining whether a signal PES_NP is greater than the predetermined write bump limit even in the area A–B or C–D.

Figure 9:
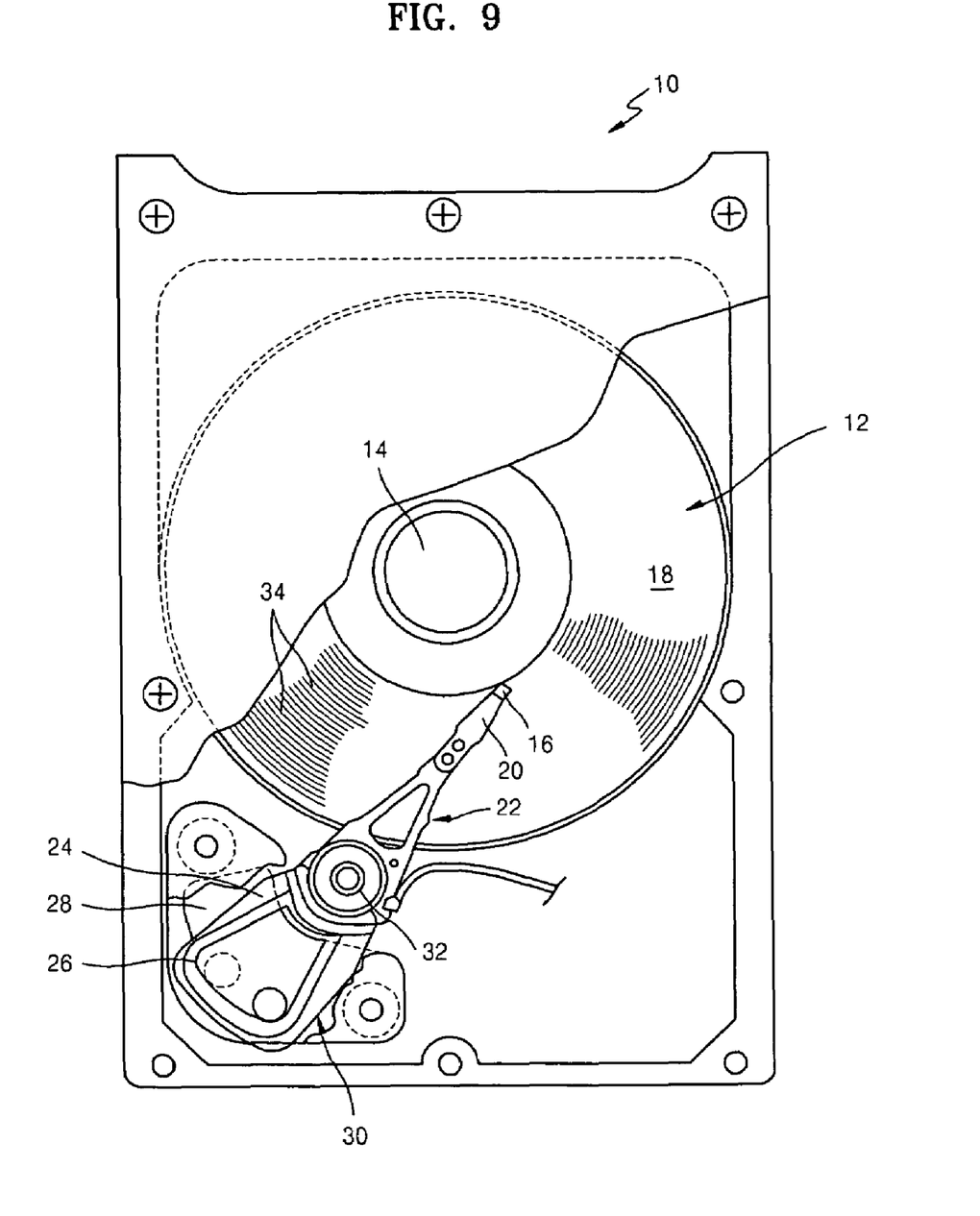
FIG. 9 shows a hard disk drive according to an exemplary embodiment of the present invention.

FIG. 9 shows a hard disk drive 10 according to an exemplary embodiment of the present invention. Referring to FIG. 9, the hard disk drive 10 includes a disk 12 rotated by a spindle motor 14 and a head 16 that is adjacent to a disk surface 18 and has access to the disk 12.

The disk 12 is rotated by the spindle motor 14, and the head 16 can read or write information from or on the disk 12 that rotates, by sensing a magnetic field formed on the surface of the disk 12 or magnetizing the surface of the disk 12. Although a single head 16 is shown in FIG. 6, it must be understood that the head 16 includes a write head for magnetizing the disk 12 and a read head for sensing the magnetic field of the disk 12, which are monolithically formed.

The head 16 can be formed with a slider (not shown) integrally. The slider is configured to generate an air bearing between the head 16 and the surface of the disk 18. The slider can be attached to a suspension 20 and the suspension 20 can be formed with a head gimbal assembly (HGA) 22 integrally. The HGA 22 is attached to an actuator arm 24 having a voice coil 26.

The voice coil 26 constitutes a voice coil motor (VCM) 30 together with a magnetic assembly 28. If current is supplied to the voice coil 26, a torque for rotating the actuator arm 24 with respect to a bearing assembly 32 is generated. Rotation of the actuator arm 24 may cause the head 16 to move across the disk surface 18.

Information is stored in concentric tracks 34 of the disk 12. In general, each track 34 includes a plurality of sectors, and each sector includes a user data area and a servo data area. A gray code for identifying sectors and tracks (or cylinders) or a servo burst signal for controlling the position of the head is written in the servo data area.

Figure 10:
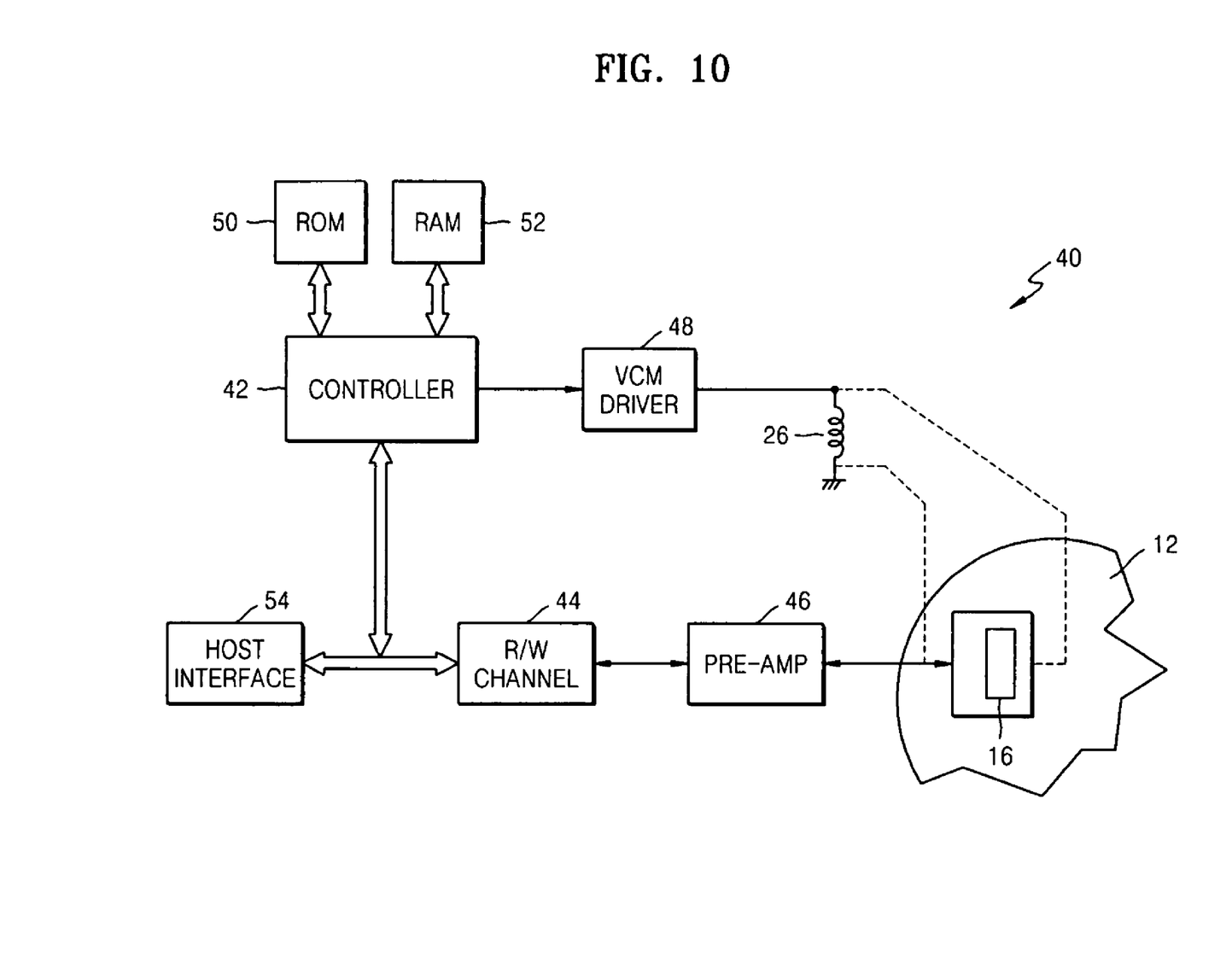
FIG. 10 is a block diagram of an exemplary embodiment of an electric system for controlling the hard disk drive shown in FIG. 9.

FIG. 10 is a block diagram of an exemplary embodiment of an electric system 40 for controlling the hard disk drive 10 shown in FIG. 9.

The electric system 40 of FIG. 10 includes a controller 42 electrically combined with the head 16 using a read/write (R/W) channel 44 and a pre-amp 46. The controller 42 may be a digital signal processor (DSP), a microprocessor, a micro-controller, or the like. The controller 42 can transmit a control signal to the R/W channel 44 so as to read or write data from or on the disk 12.

Information is transmitted between the R/W channel 44 and a host interface 54. The host interface 54 includes a controller for interfacing the hard disk drive 10 with a host system such as a personal computer (PC) and a buffer memory for buffering information transmitted between the hard disk drive 10 and the host system.

The controller 42 is also combined with a VCM driver 48 for supplying a driving current to the voice coil 26. The controller 42 supplies a control signal to the VCM driver 48 so as to control the movement of the head 16.

The controller 42 can be combined with read-only memory (ROM) 50 and random access memory (RAM) 52. The memory 50 and/or memory 52 may include commands and data used by the controller 42 so as to run a software routine. For example, the write control method of a hard disk drive illustrated in FIG. 7 may be included in one of software routines. ROM 50 and RAM 42 are examples of memory devices. Other memory devices may also be used. For example, ROM 50 may be a flash memory.

In a data read mode, the hard disk drive 10 amplifies an electrical signal sensed by a converter 16 (referred to as a head) from the disk 12 to be easily signal-processed by the pre-amp 46. Then, the R/W channel 44 encodes the amplified analog signal into a digital signal that can be read by a host device (not shown), converts the encoded signal into stream data and temporarily stores the stream data in a buffer (not shown) and then is transmitted to the host device via the host interface 54.

Next, in a data write mode, the hard disk drive 10 receives data from the host device via the host interface 54, temporarily stores the data in a buffer (not shown), sequentially outputs the data stored in the buffer, converts the data into a binary data stream suitable for a recording channel using the R/W channel 44 and then, writes a recording current amplified by the pre-amp 46 on the disk 12 using the converter 16.

The controller 42 analyzes commands received from the host device via the host interface 54 and performs control based on the analyzed result. If a write command is inputted from the host device, the controller 42 follows up tracks by referring to servo information written in on servo sectors and writes data in data sectors between the servo sectors.

An exemplary embodiment of a write operation performed by the write control method of a hard disk drive according to the present invention will now be described in details.

If the write command is inputted, the controller 42 determines whether a target offtrack is in the area A–B or C–D of FIG. 4. If the target offtrack is in the area A–B or C–D, all PESs are calculated by A–B or C–D and all PESs are calculated by N and P. If the target offtrack is not in the area A–B or C–D, PESs are calculated by N or P.

The controller 42 determines whether the calculated PES is within a predetermined write bump limit. Specifically, if all of PES_(A–B), PES_(C–D), and PES_NP are only in the predetermined write bump limit, data writing is performed at the target offtrack, and if all of PES_(A–B), PES_(C–D), and PES_NP are not in the predetermined write bump limit, data writing at the target offtrack is prohibited.

The invention can be embodied as a method, an apparatus, or a system.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., ROM, floppy disks, hard disks, etc.), optical recording media (e.g., CD-ROMs, or DVDs), random access memory media, and storage/transmission media such as carrier waves. Examples of storage/transmission media may include wired or wireless transmission media (such as transmission through the Internet). An example of wired transmission media is an optical fiber medium, and an example of wireless transmission medium is a radio frequency medium. The medium may also be a distributed network, so that the computer readable code/instructions is stored/transferred and executed in a distributed fashion. The computer readable code/instructions may be executed by one or more processors.

As described above, in the write control method of a hard disk drive, a hard disk drive obtained by the method, and a recording medium according to the present invention, even when a primary PES is distorted by a defective servo bursts, it is additionally checked using a secondary PES whether a head is within a predetermined write bump limit such that a data loss on an adjacent track can be effectively prevented.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A write control method of a hard disk drive having a disk where servo bursts are written radially, the method comprising:

generating a primary position error signals (PESs) with respect to a target offtrack based on a difference between servo burst signals read from two adjacent servo bursts;

generating a secondary PES with respect to the target offtrack based on a sum of the primary PESs or a difference there between;

determining whether both the primary PESs and the secondary PES are within a predetermined write bump limit; and performing a write operation at the target offtrack if both the primary PESs and the secondary PES are within the predetermined write bump limit, otherwise prohibiting the write operation.

2. The method of claim 1, a periphery area of a target track is divided into a plurality of areas, according to the amount of target offtrack, including area A–B where the primary PES calculated by A servo burst and B servo burst is to be used, an area C–D where the primary PES calculated by C servo burst and D servo burst, and an area NP where the secondary PES is to be used wherein performing the write operation in the area A–B and the area C–D when not only the primary PES but also the secondary PES are within the predetermined write bump limit.

3. A hard disk drive comprising:
a disk having servo bursts written radially;
a spindle motor rotating the disk;
a head writing or reading information in or from the disk;
a voice coil motor (VCM) driver driving a VCM that moves the head across a surface of the disk; and
a controller controlling the VCM driver to write data at a target offtrack by the head,
wherein the controller determines whether not only a primary position error signals (PESs) calculated by a difference between servo burst signals read from adjacent servo bursts but also a secondary PES calculated by a sum or difference of the primary PESs are within a predetermined write bump limit, and controls to start a write operation if the primary and the secondary PES are within the predetermined write bump limit, otherwise to prohibit the write operation.

4. A computer-readable recording medium on which a program for a write control of a hard disk drive having a disk where servo bursts are written radially, the program controls the hard disk drive according to a process comprising:

generating a primary position error signals (PESs) with respect to a target offtrack based on a difference between servo burst signals read from two adjacent servo bursts;

generating a secondary PES with respect to the target offtrack based on a sum of the primary PESs or a difference there between;

determining whether both the primary PESs and the secondary PES are within a predetermined write bump limit; and performing a write operation at the target offtrack if both the primary PESs and the secondary PES are within the predetermined write bump limit, otherwise prohibiting the write operation.

5. The computer-readable recording medium of claim 4, a periphery area of a target track is divided into a plurality of areas, according to the amount of target offtrack, including area A–B where the primary PES calculated by A servo burst and B servo burst is to be used, an area C–D where the primary PES calculated by C servo burst and D servo burst, and an area NP where the secondary PES is to be used, wherein performing the write operation in the area A–B and the area C–D when not only the primary PES but also the secondary PES is within the predetermined write bump limit.

6. A write control method of a hard disk drive having a disk where servo bursts are written radially, the method comprising:

determining whether a target offtrack exists in the area A–B or C–D;

calculating at least one position error signal PES_NP by N or P if the target offtrack does not exist in the area A–B or C–D;

determining if the at least one PES_NP is within a predetermined write bump limit;

prohibiting writing to the disk if the PES_NP is not within a predetermined write bump limit; and performing a write operation if the PES_NP is within a predetermined write bump limit.

7. A write control method of a hard disk drive having a disk where servo bursts are written radially, the method comprising:

calculating position error signal PES by A–B or C–D and PES_NP by N or P;

determining if both PES and PES_NP are within a predetermined write bump limit;

prohibiting writing to the disk if either PES or PES_NP is not within a predetermined write bump limit; and performing a write operation if both PES and PES_NP are within a predetermined write bump limit.

* * * * *